United States Patent
Dick

[15] 3,643,337
[45] Feb. 22, 1972

[54] AUTOMOBILE FRONT END ALIGNMENT EQUIPMENT

[72] Inventor: Roy E. Dick, 3758 Blue Rock Road, Cincinnati, Ohio 45239

[22] Filed: Aug. 5, 1968

[21] Appl. No.: 757,190

Related U.S. Application Data

[63] Continuation-in-part of Ser. No. 386,460, May 19, 1964.

[52] U.S. Cl. .................................... 33/203.13, 33/203.18
[51] Int. Cl. .......................................................... G01b 7/30
[58] Field of Search ..................... 33/203.12, 203.13, 203.14

[56] References Cited

UNITED STATES PATENTS

| | | | |
|---|---|---|---|
| 2,777,211 | 1/1957 | Martin | 33/203.13 |
| 3,187,440 | 6/1965 | Merrill et al. | 33/203.13 |
| 3,411,346 | 11/1968 | Gagliardi | 33/203.13 X |
| 3,457,653 | 7/1969 | Dick | 33/203.18 X |

Primary Examiner—William D. Martin, Jr.
Attorney—Pearce & Schaeperlaus

[57] ABSTRACT

Automobile front end alignment equipment in which a platform comprised of a pair of trucks correlated for like orientation while free for universal movement on a horizontal surface, supports respective carriages for free swinging about respective vertical axes, which carriages engagingly support front wheels of a vehicle in predetermined relation to the wheels of a vehicle, and a bracket attachable to a wheel whereby correlated toe-in toe-out and camber of wheels may be simultaneously measured.

8 Claims, 12 Drawing Figures

PATENTED FEB 22 1972

INVENTOR.
ROY E. DICK
BY Pearce & Schaeperklaus

Attorneys

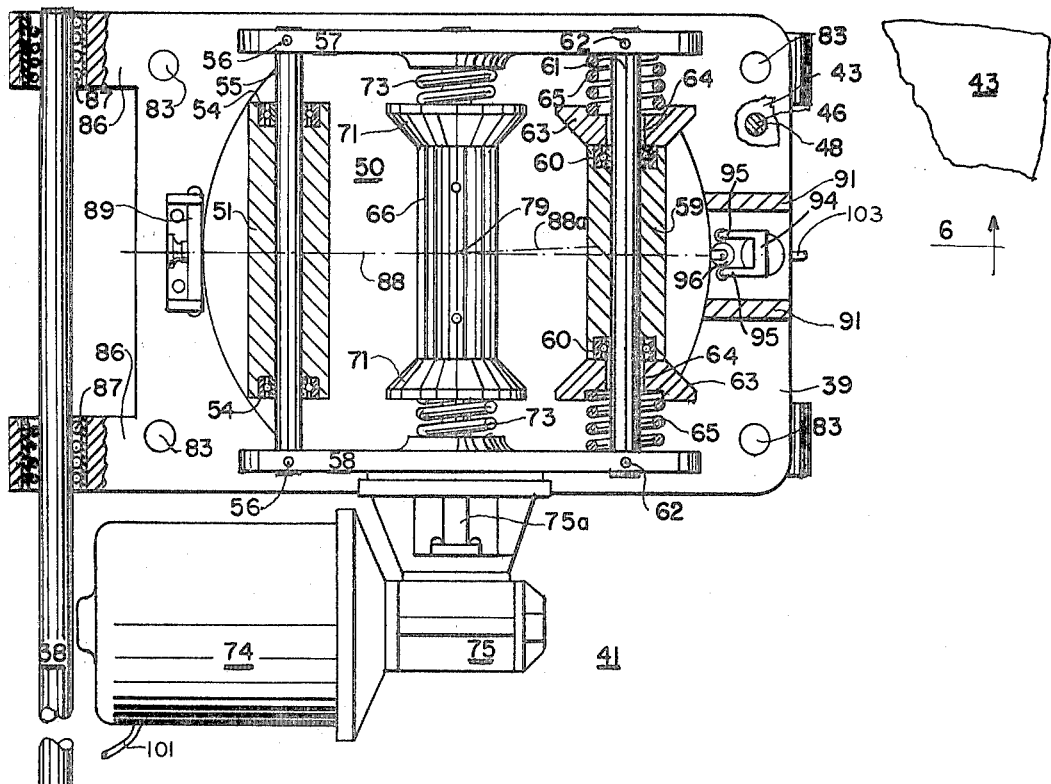
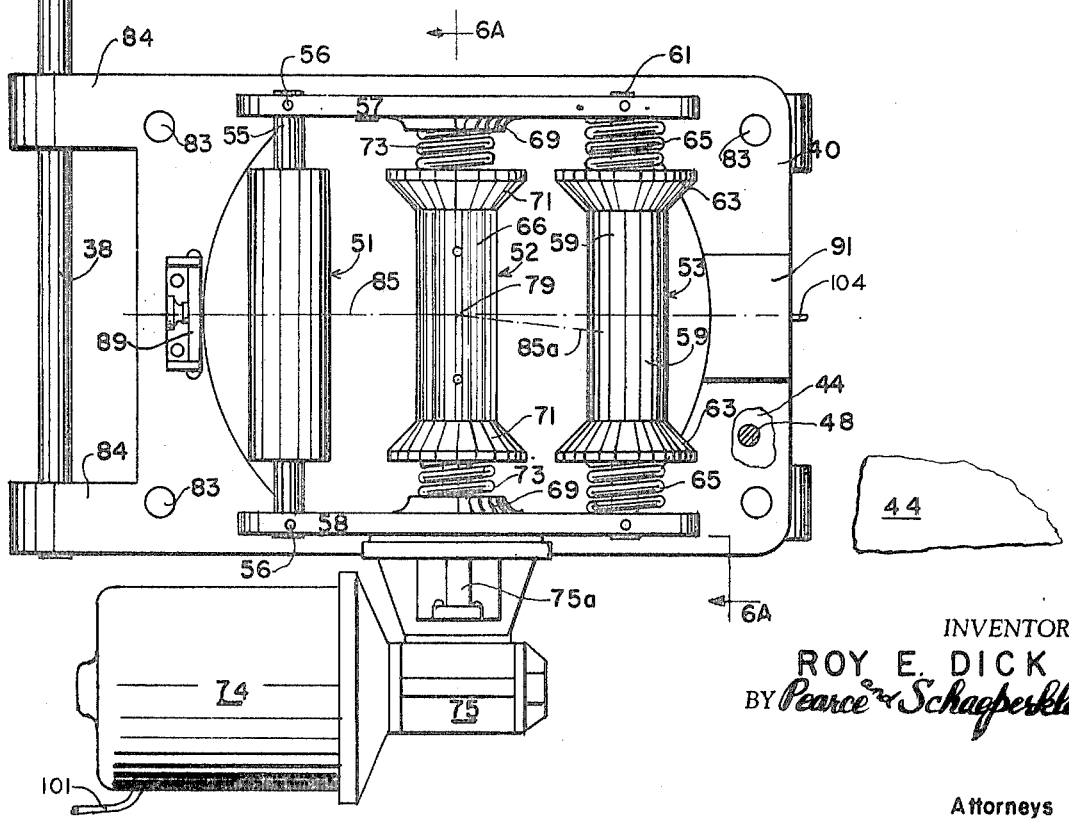
FIG. 5

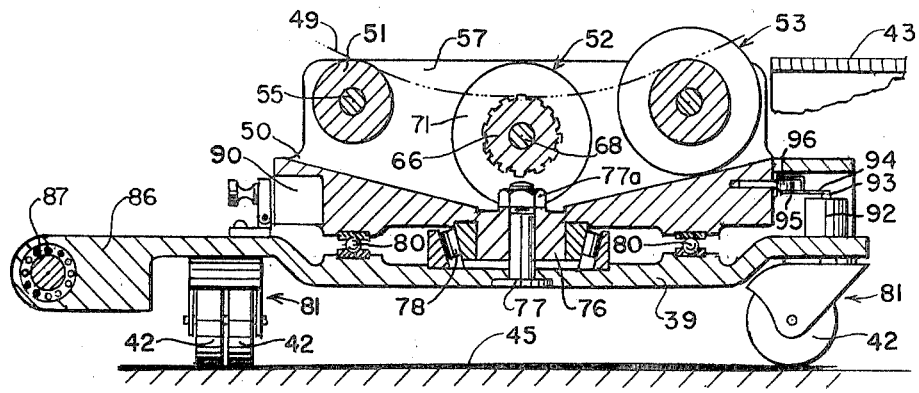

AUTOMOBILE FRONT END ALIGNMENT EQUIPMENT

This application is a continuation-in-part of my copending application Ser. No. 386,460 filed May 19, 1964.

This invention relates to devices for aligning wheels of an automotive vehicle or the like. In particular, this invention relates to a device having electrically operated gauges which indicate the camber of wheels and the degree of toe-in or toe-out of the wheels of a vehicle.

An object of this invention is to provide a device which can be mounted on a wheel and which, upon adjustment in place on the wheel, indicates on a galvanometer the degree of camber of the wheel.

A further object of this invention is to provide such a device in which an upright column can be attached to a wheel and in which an indicator arm pivotally connected to the column can be adjustably swung to a horizontal position and in which swinging of the adjustment arm actuates a potentiometer to cause registry on a galvanometer of a value determined by the degree of camber of the wheel.

A further object of this invention is to provide a device for measuring the degree of toe-in or out of a vehicle in which the wheels are positioned on rollers carried by carriages which can swing as the wheels are rotated and in which a linkage is connected to each carriage for operating a potentiometer, the reading of the potentiometers being determined by the degree of swinging of the carriage caused by the toe-in or toe-out of the wheels mounted thereon.

A further object of this invention is to provide such a device in which each carriage cooperates with a fork or gear connected to one of the potentiometers for swinging or turning the potentiometer to a degree determined by the degree of swinging of the carriage and in which each potentiometer is connected to a galvanometer which provides readings indicating the degree of swinging of the carriage.

A further object of this invention is to provide such a device in which the carriages are mounted on respective trucks which are in cooperation with a truck correllating bar and spaceable from one another in relation to the vehicle wheel tread spacing.

A further object of this invention is to provide at least one truck with supporting wheels which permit free shifting in any substantially horizontal direction.

A further object of this invention is to provide on each carriage, roller structure which so cooperates with a vehicle wheel tire thereon that the carriage and truck are urged to seek location in central lateral relation beneath said tire.

A further object of this invention is to provide such a device in which the galvanometers are located in association on a console for simultaneously reading and comparison.

A further object of this invention is to provide such a device in which motor-driven rollers of the carriage cause rotation of the wheels of the vehicle.

The above and other objects and features of the invention will be apparent to those skilled in the art to which this invention pertains from the following detailed description, and the drawings, in which:

FIG. 5 is a plan view of a portion of the device for determining the degree of toe-in or out of wheels; portions of ramps thereof being omitted, the centerline of the operative position of tires on the wheels being shown in dot-dash lines;

FIG. 6 is a view in vertical section taken on the line 6—6 in FIG. 5, and portions being omitted for clarity;

FIG. 6A is a view in vertical section taken on the line 6A—6A in FIG. 5;

FIG. 7 is a view in side elevation of a rear wheel support stand;

FIG. 7A is a view in end elevation of the rear wheel support stand shown in FIG. 7;

FIG. 8 is a view in front elevation of a control console;

FIG. 8A is a view in end elevation of the console of FIG. 8; and

In the following detailed description and the drawings, like reference characters indicate like parts.

Figure 1:
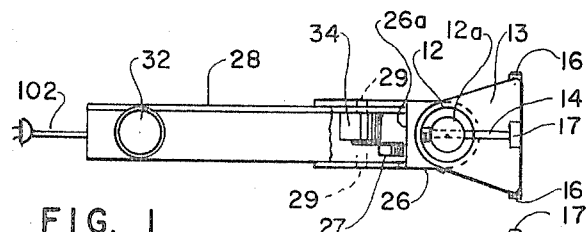
FIG. 1 is a plan view of a device for determining camber of a wheel, the device being constructed in accordance with an embodiment of this invention.
Figure 2:
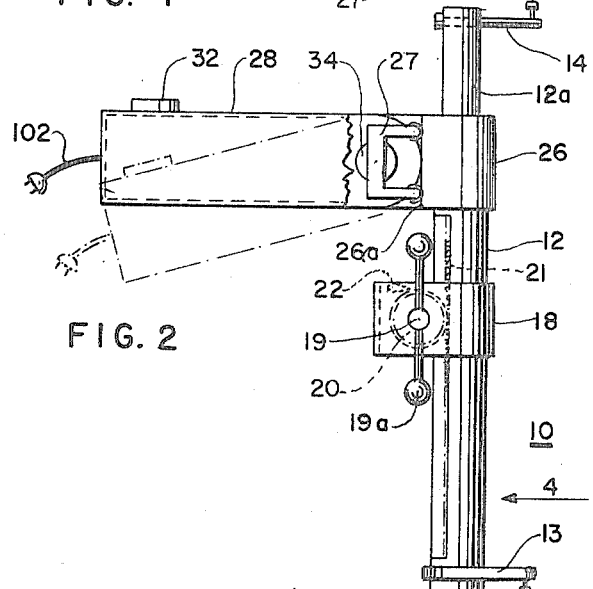
FIG. 2 is a view in side elevation of the device illustrated in FIG. 1 partly broken away and in section to reveal interior construction, an alternate position of an actuator arm thereof being indicated in dot-dash lines.
Figure 4:
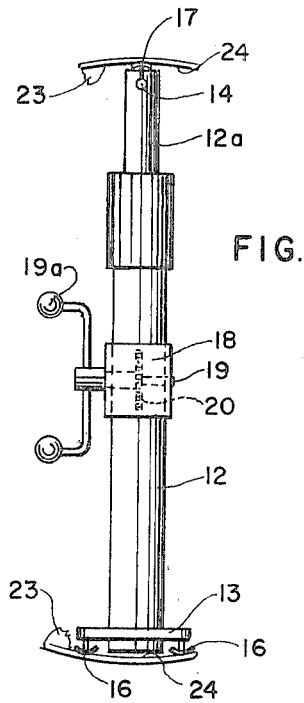
FIG. 4 is a view in side elevation taken in the direction of arrow 4 in FIG. 2.
Figure 3:
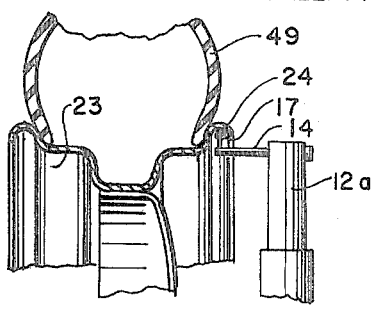
FIG. 3 is a fragmentary view in transverse section showing the device mounted on a wheel of a vehicle.

In FIGS. 1, 2, and 4 inclusive is illustrated a camber determining device indicated generally at 10, which forms a portion of an alignment determining device constructed in accordance with an embodiment of this invention. The device 10 includes an upright column or main bracket 12 on which is mounted a stationary bracket 13 and an extension portion 12a carrying a movable bracket 14. The stationary bracket 13 carries a pair of abutment members 16. The movable bracket 14 carries a single abutment member 17. The movable bracket 14 includes a main bar secured to extension portion 12a of the main bracket. An arm 18 is mounted on main bracket 12 and transverse horizontal shaft 19 is journaled therein. Shaft 19 is rotatable by means of crank handle 19a and carries pinion gear 20 in mesh with rack teeth 21 of extension portion 12a. A lock pawl 22 is pivotally mounted on arm 18 for use in locking pinion 20 to secure extension portion 12a against telescoping into main bracket 12. The column can be mounted in engagement with a front wheel 23 of a vehicle, as indicated in FIGS. 3 and 4, with the ball members 16 and 17 engaging a rim portion 24 of the wheel. A hinge member 26 (FIGS. 1 and 2) is fixedly attached to the column 12. The column is mounted with the hinge member 26 extending transversely of the wheel and the axis of the hinge substantially horizontal. An actuator arm 28 is pivotally mounted on hinge pins 29 (FIG. 1) carried by the hinge member 26 and can swing from the position shown in full lines in FIG. 2 to positions such as the one shown in dot-dash lines in FIG. 2. A potentiometer 34 is mounted in the actuator arm 28 and the stationary fork 27 mounted on the shaft of potentiometer 34 cooperates with surface 26a of member 26. A bubble level 32 (FIGS. 1 and 2) is mounted on the actuator arm 28 so that, as the actuator arm is swung between the positions illustrated in FIG. 2, the position at which the actuator arm 28 is horizontal can be determined from the bubble level 32. The potentiometer 34 mounted on actuator arm 28 rotates about a shaft thereof which is held against rotation, that is in fixed relation to hinge member 26 by fork 27 carried on said shaft, so that, as the actuator arm 28 is swung up or down, the movable contact of the potentiometer moves along the coil thereof. A galvanometer 36 is connected to the potentiometer 34 and, as the movable contact of the potentiometer moves along the coil thereof, the reading of the galvanometer is varied, and the reading of the galvanometer indicates the degree to which the position of the column varies from the vertical, thus indicating the degree of camber of the wheel. The electrical connections between the potentiometer 34 and the galvanometer 36 will be described in greater detail hereinafter in connection with the overall electrical circuitry of the device.

When the degree of camber of the wheel has been determined with the aid of the camber-determining device 10, any adjustments needed in the camber of the wheel can be made. Then, the camber-determining device can be temporarily removed from the wheel and used in similar manner in connection with the second front wheel, and the front wheels then placed in cooperative relation on toe-in alignment platform 41 (shown in FIGS. 5, 6, and 6A) and the rear wheels are supported at like elevation as by stands 47 which as shown in FIGS. 7 and 7A may have an upper contour similar to that of rollers 51, 52, and 53. The platform 41 is comprised of bar 38 and trucks 39, 40 supported on wheels 42, which support the platform trucks 39, 40 in substantially horizontal position. In such placement of the front wheels, ramps 43 and 44 can be used and are temporarily attached to the trucks 39, 40 of platform 41 by means of pins 46. The pins 46 extend through integral portions of the ramps, and are received in upright bores 48 (FIG. 5) in the trucks 41. The ramps can guide wheels of a vehicle into position on mechanism carried by the trucks 39, 40 on which tires 49 of the vehicle are shown in FIGS. 6 and 6A. The trucks 39, 40 and the mechanism carried thereby are in large degree duplicates and like reference characters will be applied to like parts thereof. When the wheels of a vehicle are in the position shown in FIGS. 6 and 6A, each tie is disposed on rollers 51, 52, and 53 (FIGS. 5, 6, and 6A). The rollers 51, 52, and 53 are mounted on a swinging carriage 50 which in turn is mounted on a respective one of trucks 39, 40 for swinging about a substantially vertical axis 79.

Roller 51 is journaled on bearings 54 mounted on shaft 55 which is in turn supported by carriage 50 to which it is fixed adjacent its ends by pins or set screws 56. Roller 51 is centered on shaft 55 between side flanges 57, 58 of carriage 50.

Roller 53 comprises a cylindrical central portion 59 mounted in bearings 60 mounted on shaft 61 which is in turn supported by carriage 50 to which it is fixed adjacent its ends by pins or setscrews 62. The cylindrical central roller portion 59 is mounted on shaft 61 in centered relation between side flanges 57, 58 of carriage 50. Laterally of cylindrical central roller portion 59, a pair of frustoconic roller portions 63 are mounted by bearings 64 for rotation on shaft 61. As shown the small diameter ends of roller portions 63 are adjacent roller portion 59. Compression springs 65 are provided annularly of shaft 61 between frustoconic roller portions 63 and carriage side flanges 57, 58 to urge roller portions 63 toward roller portions 59. A thrust bearing, not shown, may be provided between springs 65 and roller 63 to reduce frictional drag and wear. Thus roller portions 59 and 63 may rotate on shaft 61 at different speeds depending upon their engagement with a driving member such as tire 49.

Roller 52 comprises a cylindrical central roller portion 66 mounted by means such as set screws 67 in fixed relation to shaft 68 for rotation therewith and of a width slightly shorter than the transverse width of the tire treads which will cooperate therewith. Roller portion 66, so mounted, is centered between carriage side flanges 57, 58. As shown in FIG. 5, side flanges 57, 58 may have integral boss portions 69 and support journal bearings 70 for shaft 68. Laterally of cylindrical central roller portion 66, a pair of frustoconic roller portions 71 are mounted by bearings 72, for rotation on shaft 68. The small diameter ends of roller portions 71 are adjacent roller portion 66. Compression springs 73 are provided annularly of shaft 68 between frustoconic roller portions 71 and carriage side flanges 57, 58 to urge roller portions 71 toward roller portion 66. A thrust bearing, not shown, may be provided between spring 73 and roller 71 to reduce frictional drag and wear. Thus frustoconic roller portions 71 may rotate relative to shaft 68 and central roller portion 66 at speeds dependent upon their engagement with a driving member such as tire 49.

Shaft 68, journaled for rotation in bearings 70 is thus supported by carriage 50.

A motor 74 having an angle drive speed reduction gear box 75, is mounted on carriage 50 with its output shaft 75a in driving relation to shaft 68 such that cylindrical central roller portion 66 may by operation of motor 74 apply driving power to tire 49 to rotate same.

As shown in FIGS. 6 and 6A, carriages 50 each have a central hub boss 76 through which retaining bolt 77 extends and annularly of which a tapered roller bearing 78 supports carriage 50 for rotation about the central vertical axis 79. An additional thrust bearing 80 is provided annularly of hub boss 76 to support the carriage adjacent the periphery thereof. Bolt 77 in cooperation with nut 77a (and suitable washers and the like not shown) provide initial load on the bearings 78, 80 and preclude separation of the carriage from the truck.

Each truck 39 and 40 is provided with means for easy rolling movement in any direction over surface 45 which as shown may be a plurality of supporting casters 81, which as shown are preferably of a type which readily roll in any direction and thus facilitate movement of the truck in any direction. The axis about which the casters shown swivel, lies in a plane between the dual wheels 42 thereof and is coincident with the axis of the caster shank or tank 83.

Means are provided for retaining the trucks 39, 40 in abreast relation while permitting them to seek spacing related to the tread spacing of the wheels 49 supported on carriages 50. As shown truck 40 has a pair of projecting arms 84 in which bar 38 is secured in fixed relation and extending horizontally perpendicular to the centerline 85 of truck 40. Truck 39 has a pair of arms 86 in which low friction bearings 87 are provided. Bar 38 is received in cooperative relation to bearings 87 such that truck 39 may move freely toward and away from truck 40 while the truck centerlines 88 and 85 remain parallel. The swinging carriages 50 are supported on bearings 78, 80 so that the carriages can swing freely of the pivots thereof. However, swingable lock dogs 89 are provided for locking the carriages by clockwise swing of the dog from the position shown in FIG. 6 into notch 90. The swinging carriages 50 may thus be locked in centered position, the trucks shifted as needed to place the carriage to receive the wheel before the wheels are moved into position on the rollers thereof.

When the wheels have been mounted on the rollers 51, 52, and 53, the dogs 89 are released and through operation of motors 74 the rollers and wheels are rotated in unison. As the wheels 49 rotate, driven by roller portions 66 in cooperative engagement with the tire treads, the frustoconic faces of the roller portions 63, 71 engage the side walls of the tire outboard of the tread and urge the tire to center on roller portions 51, 66, and 59. Such centering of the tire will urge the trucks 39, 40 to spaced relation such that the spacing of the center line of the tire treads will substantially equal the spacing of the centerlines of the respective trucks. Simultaneously the carriages 50, free to rotate about their axes 79, swing into positions in which their centerlines respectively coincide with the centerline of the respective engaging tire tread.

Each truck-carriage assembly has means for sensing and communicating the relative position of axial rotation of the carriage to the truck. Each truck, as shown, has a protective housing 91 in which a potentiometer 92 is mounted in fixed relation to the truck with its shaft 93 vertical. A fork 94 mounted on shaft 93 has a pair of horizontal arms 95 (FIG. 5) between which finger or roller 96 projects. Finger or roller 96 projects radially horizontally from carriage 50, as illustrated in FIGS. 5 and 6, into contact 93' with arms 95.

Figure 9:
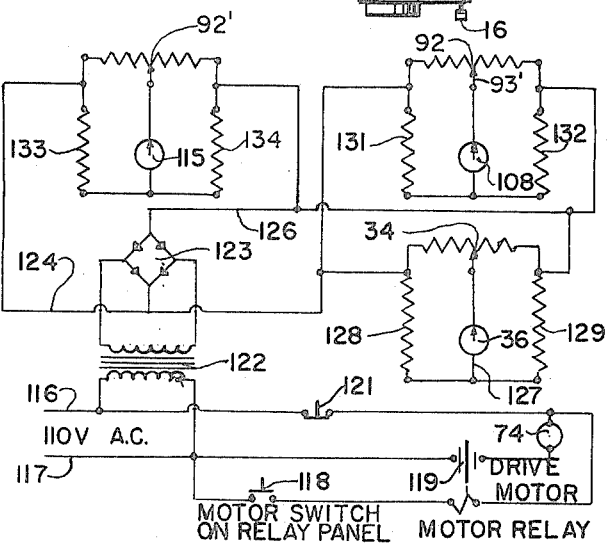
FIG. 9 is a schematic wiring diagram of the device.

As the rollers 66 are rotated to turn the vehicle wheels, the swinging carriage 50 can swing from the neutral position shown in full lines to a position such as that indicated in dot-dash lines at 85a, 88a, the amplitude of swinging being determined by the degree of "toe-in" or "toe-out" of the tires 49. As the swinging carriage 50 swings, angular rotation of carriage 50 about axis 79 thus results in related rotation of potentiometer shaft 93, which extends into and operates a movable contact of potentiometer 92. As shown in FIG. 9, the potentiometer 92 is connected to a galvanometer 108 in such a manner that the reading of the galvanometer 108 indicates the degree to which the movable contact of the potentiometer is displaced incident to the swinging of carriage 50 of truck 39 (FIG. 5). Similarly, a potentiometer 92' on truck 40 is operated by carriage 50 on truck 40. The potentiometer 92' is connected to a galvanometer 115 (FIG. 9), and the reading of the galvanometer 115 indicates the degree of displacement of the movable contact of the potentiometer 92' incident to swinging of the swinging carriage 50 of truck 40 (FIG. 5). Carriage 50 may have provision for mounting of finger or roller 96 in a plurality of predetermined stations corresponding to positions which wheels assume when turned for steering the vehicle. As shown in FIG. 8, the galvanometers 36, 108, 115 and motor switch 118–121 are mounted in console 32 and may have associated pilot lights 35, 107, 114, 120 for indicating when the respective circuits are energized. The circuits containing galvanometers 36, 108, 115 respectively may be controlled by switches 35, 109, and 110.

The electric circuitry of the device is shown in FIG. 9. Electric power is supplied through power leads 116 and 117. Operation of the drive motors 74 is initiated by closing of a motor switch 118 which energizes motor starting relays 119 (of which one is shown). The motors can be stopped by opening a motor stop switch 121.

Power for galvanometers and potentiometers is supplied through a transformer 122 and a rectifier 123 which supplies unidirectional current of appropriate voltage across leads 124 and 126. Coils of the potentiometers 34, 92 and 92' are connected across the leads 124 and 126. One lead of the galvanometer 36 is attached to a line 127 which is connected to the leads 124 and 126 through equal voltage dividing resistors 128 and 129, respectively, so that the line 127 is at a potential midway between the voltages of the leads 124 and 126. The movable contact of the potentiometer 34 is connected to the other side of the galvanometer 36 so that the galvanometer 36 has a zero reading when the movable contact of the potentiometer 34 is centered on the coil thereof, and displacement of the movable contact in opposite directions causes deflection of the indicator of the galvanometer 36 in opposite directions. In a similar manner, one lead of the galvanometer 108 is connected between voltage dividing resistors 131 and 132 connected to the leads 124 and 126 respectively, and the other lead of the galvanometer 108 is connected to the movable contact of the potentiometer 92. The galvanometer 115 is similarly connected between voltage dividing resistors 133 and 134 which are connected to the leads 124 and 126, respectively, and to the movable contact of the potentiometer 92'. Thus, each galvanometer registers the degree to which the movable contact of the potentiometer associated therewith is displaced from a zero reading. From the galvanometer 36 is determined the degree of the camber of a wheel. If desired a second camber determining device 10 with a respective galvanometer 36 can also be used to obtain simultaneous determination of camber of a second wheel. From the galvanometers 108 and 115 is determined the degree of toe-in or toe-out of the wheels, and from these readings can be determined the degree and type of adjustments required to correct alignment of the wheels.

Cable 100 provides electrical connection between the power source and console 32, while console 32 and motors 74, potentiometers 34, 92 and 92' are respectively provided by cables 101, 102, 103 and 104.

The alignment indicating device illustrated in the drawings and described above is subject to structural modification without departing from the spirit and scope of the appended claims.

Having described my invention, what I claim as new and desire to secure by letters patent is:

1. A device for indicating alignment of wheels of a vehicle when engaging only the treads of said wheels which comprises a platform including two trucks coupled by means retaining the trucks against change in relative orientation while permitting translatory movement of at least one truck toward and away from the other truck, a pair of carriages mounted on said pair of platform trucks for swinging in substantially horizontal planes, a pair of rollers rotatably mounted on each carriage for supporting tires and wheels of the vehicle, a third roller rotatably mounted on each carriage and flanged to cooperate with the tread face and edges of a tire to center same on the carriage and thereby cause the platform trucks to assume a spacing related to the spacing of the vehicle wheels supported on the carriages, means for unisonly rotating one of the rollers on each carriage for rotating the vehicle wheels thereon, a potentiometer connected to each carriage, a movable contact of each potentiometer being displaceable to a degree determined by the swing of the carriage associated therewith and a galvanometer connected to each potentiometer to register the degree of displacement of the movable contact thereof for indicating the swinging of the carriage associated therewith.

2. A device for indicating alignment of wheels of a vehicle when engaging only the treads of said wheels which comprises a platform including at least one truck coupled to means retaining the truck against change in relative orientation while permitting translatory lateral movement of said truck, a carriage mounted on said truck for swinging in a substantially horizontal plane, a pair of rollers rotatably mounted on said carriage for supporting a tire and wheel of the vehicle, a third roller rotatably mounted on said carriage and flanged to cooperate with the tread face and edges of a tire to center same on the carriage and thereby cause the truck by lateral movement to assume a position related to the location of the vehicle wheel supported on the carriage, means for rotating one of the rollers on said carriage for rotating the vehicle wheel thereon, a potentiometer connected to said carriage, a movable contact of said potentiometer being displaceable to a degree determined by the swing of the carriage and a galvanometer connected to said potentiometer to register the degree of displacement of the movable contact thereof for indicating the swing of the carriage.

3. A device for indicating alignment of wheels of a vehicle when engaging only the treads of said wheels which comprises a platform including one truck coupled to means retaining the truck against change in relative orientation while permitting translatory lateral movement of said truck, a carriage mounted on said truck for swinging in a substantially horizontal plane, a pair of rollers rotatably mounted on said carriage for supporting a tire and wheel of the vehicle, a third roller rotatably mounted on said carriage and flanged to cooperate with the tread face and edges of a tire to center same on the carriage and thereby cause the truck by lateral movement to assume a position related to the location of the vehicle wheel supported on the carriage, a second pair of rollers rotatably mounted for supporting a second tire and wheel relative to said platform, a third roller rotatably mounted for cooperation with a tire supported on said second pair of rollers and flanged to cooperate with the tread face and edges of a tire to center same on the second pair of rollers, means for unisonly rotating one of each of said pairs of rollers for rotating the vehicle wheels thereon, a potentiometer connected to said carriage, a movable contact of said potentiometer being displaceable to a degree determined by the swing of the carriage and a galvanometer connected to said potentiometer to register the degree of displacement of the movable contact thereof for indicating the swing of the carriage.

4. A device for indicating alignment of wheels of a vehicle when engaging only the treads of said wheels which comprises a platform including two trucks coupled by means retaining the trucks against change in relative orientation while permitting translatory movement of at least one truck toward and away from the other truck, a pair of carriages mounted on said pair of platform trucks for swinging in a substantially horizontal plane, a pair of rollers rotatably mounted on each carriage for supporting tires and wheels of the vehicle, a third roller rotatably mounted on each carriage and flanged to cooperate with the tread face and edges of a tire to center same on the carriage and thereby cause the platform trucks to assume a spacing related to the spacing of the vehicle wheels supported on the carriages, means for unisonly rotating one of the rollers on each carriage for rotating the vehicle wheels thereon, a potentiometer connected to each carriage, a movable contact of each potentiometer being displaceable to a degree determined by the swing of the carriage associated therewith and galvanometer means connected to the potentiometers to register the degree of displacement of the movable contacts thereof for indicating the swing of the carriages associated therewith.

5. In a device for indicating alignment of wheels of a vehicle when engaging only the treads of said wheels which comprises a pair of trucks correlated in abreast spaced relation by means permitting the truck spacing to change to form a platform, a pair of carriages, one carriage being mounted on each truck for swinging about a vertical axis, a plurality of parallel rollers on each carriage for supporting tires and wheels of the vehicle, means for simultaneously rotating one of the rollers on each carriage for rotating the vehicle wheels thereon, means cooperating with the tires outboard of the treads thereof to orient the carriage so the centerline of the tire tread extends transversely of the parallel rollers in engagement therewith, a potentiometer connected to each carriage, a movable contact of each potentiometer being displaceable to a degree determined by the swing of the carriage associated therewith, and a galvanometer connected to each potentiometer to register the displacement of the movable contact for indicating the swinging of the carriage associated therewith.

6. A device in accordance with claim 5 characterized by the fact that each truck is supported for universal horizontal movement so they will move to positions in which the carriages are supported beneath and in aligned association with the wheels.

7. A device in accordance with claim 5 in which the means cooperating with the tires outboard of the treads thereof comprise a pair of frustoconic rollers journaled for free rotation on said carriage and about a horizontal first axis, a second pair of frustoconic rollers journaled for free rotation on said carriage and about a horizontal axis parallel to the axes of said plurality of parallel rollers and to the horizontal first axis from which it is spaced, the frustoconic faces of one of each pair of frustoconic rollers engaging the tire to one side of the tread and the other frustoconic rollers engaging the tire to the other side of the tread, means urging said pairs of frustoconic rollers to assume positions symmetric about a predetermined line extending transversely of the plurality of parallel rollers.

8. A device in accordance with claim 7 characterized by the fact that the said horizontal first axis intersects the vertical axis about which the carriage swings.

* * * * *